Oct. 17, 1972  J. A. DODD, JR., ET AL  3,698,903
METHOD OF MAKING A GRADED PHOTOPRINTING MASTER
Filed Jan. 24, 1969  5 Sheets-Sheet 1
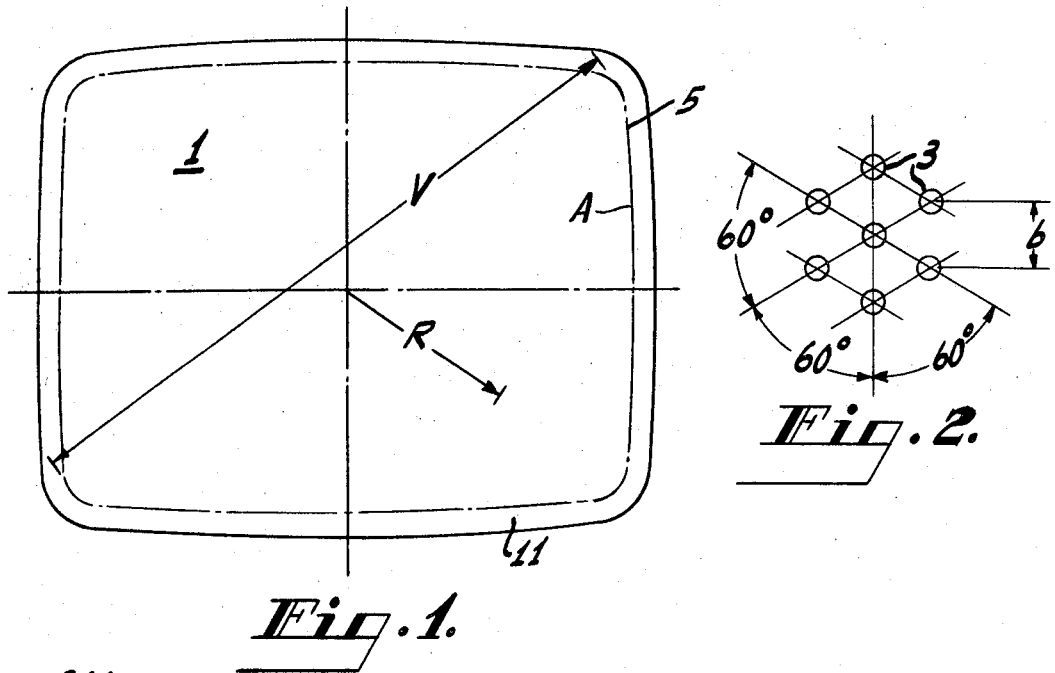
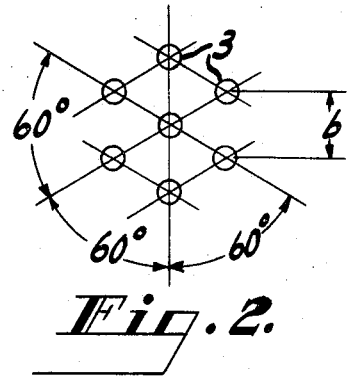
Fig. 1.
Fig. 2.
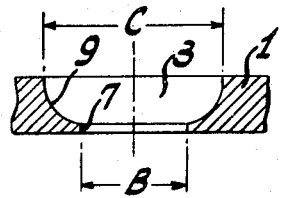
Fig. 3.
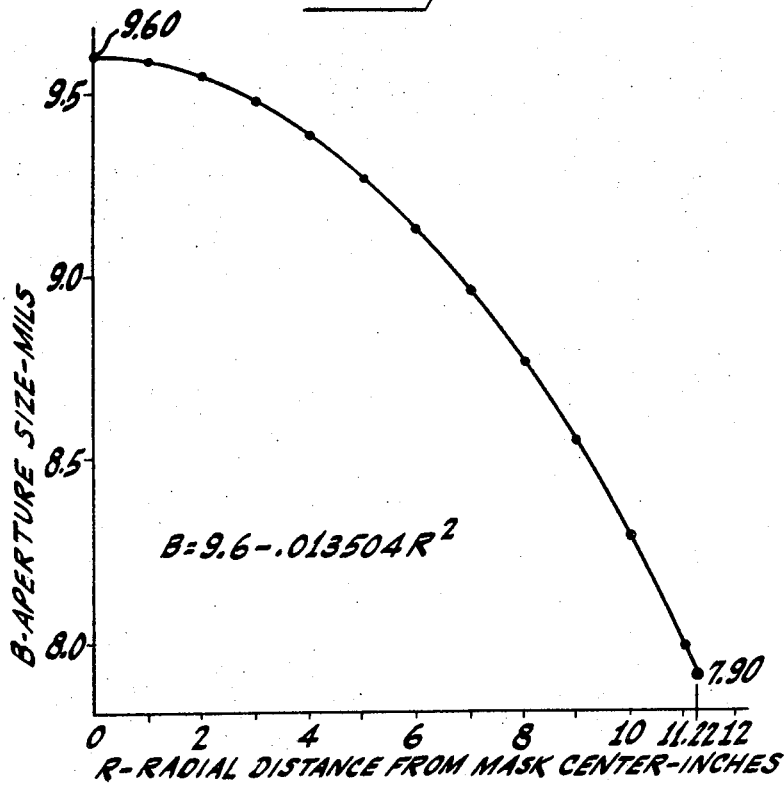
$B = 9.6 - .013504 R^2$
Fig. 4.
INVENTORS
JOHN A. DODD, JR. &
ROBERT A. GESHNER
BY Thomas R. Webb
Agent

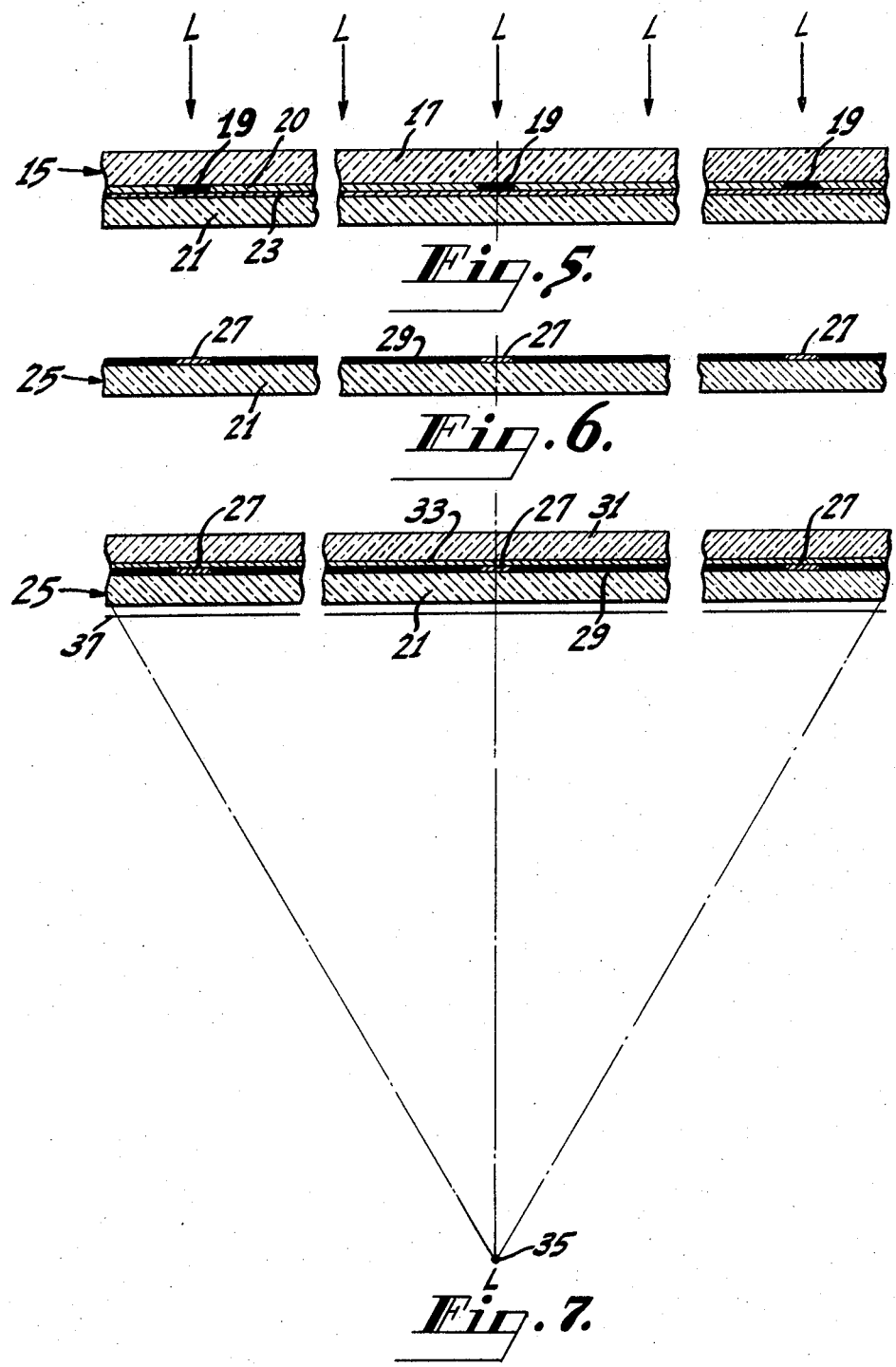

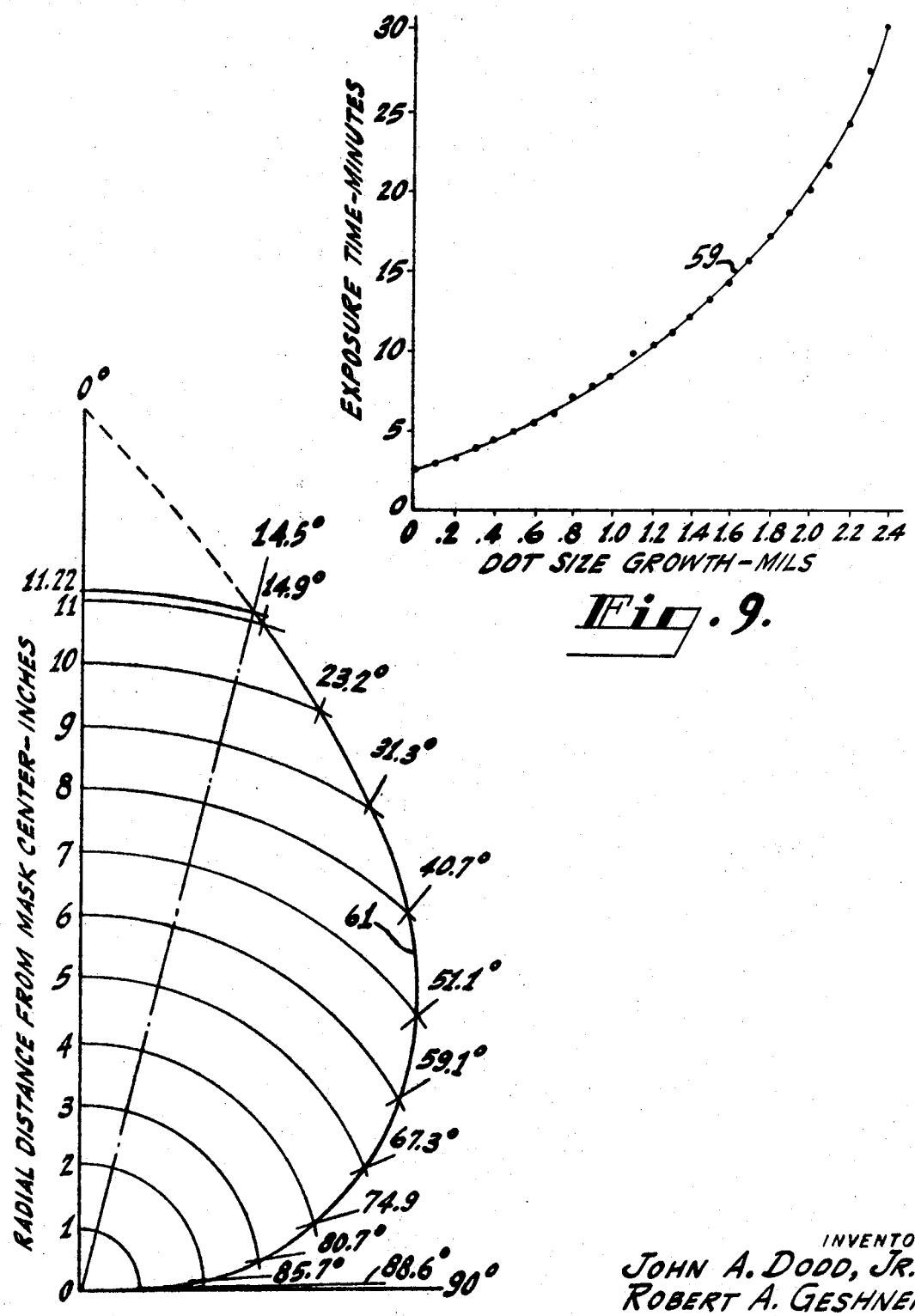

United States Patent Office 3,698,903
Patented Oct. 17, 1972

3,698,903
METHOD OF MAKING A GRADED PHOTO-PRINTING MASTER
John A. Dodd, Jr., Haddonfield, and Robert A. Geshner, Cherry Hill, N.J., assignors to RCA Corporation
Filed Jan. 24, 1969, Ser. No. 793,665
Int. Cl. G03c 5/00
U.S. Cl. 96—36.1                4 Claims

ABSTRACT OF THE DISCLOSURE

A graded dot photo-printing master is made by providing a first master comprising a multiplicity of spaced opaque dots of uniform size located in a desired pattern or array on a clear background; contact printing the first master to produce a second master comprising negative replica thereof having spaced clear areas of the same size as the dots on an opaque background; and contact printing the second master through a rotating shutter having a specially-shaped aperture for varying the time of exposure from a maximum at the center to a minimum at the outer edge, to produce a third master having spaced clear or opaque areas of graded size on an opaque or clear background, depending on the type of photographic emulsion used. When a positive type emulsion is used, to produce a third master with graded clear areas on an opaque background, that stencil is subsequently contact printed with a negative-type emulsion to produce the final graded dot master with spaced opaque dots varying in size from a maximum at the center to a minimum at the outer edge. This final master is used, with another master having a similar pattern of uniform larger-size opaque dots, to form the holes in a graded mask for a color picture tube.

BACKGROUND OF THE INVENTION

The present invention relates to a new method of making a multiple-dot master having graded dot sizes, from which graded-hole shadow masks for color picture tubes can be produced.

In a conventional shadow mask color kinescope, the viewing screen comprises a mosaic of red, blue and green phosphor dots in a systematic array and color selection is achieved by projecting three electron beams from laterally spaced electron guns through a multi-apertured shadow mask mounted in front of the screen. The color phosphor dots are usually deposited in a hexagonal array of substantially-tangent dots, in which case the shadow mask has a similar hexagonal array of spaced apertures or holes with one aperture for each triangular group of three phoshpor dots.

The shadow mask is usually made by coating both sides of a thin flat steel sheet with photosensitive layers, exposing each side through a master having an opaque dot pattern of the mask apertures desired, developing the layers to remove the unexposed portions and leave holes therein corresponding to the dots in the master, and then etching the sheet through the holes with acid to form the mask apertures. The flat mask is subsequently pressed to the desired curvature.

It is conventional to use a shadow mask having graded apertures, that is, apertures of different diameters decreasing in diameter outwardly from a maximum diameter at the center of the mask, as disclosed and claimed in Morrell Pat. 2,755,402, granted July 17, 1956. The patent discloses a method of making a master for a graded mask wherein a photographic print is made by exposing a mask having uniform size apertures to parallel light rays passing through an optical filter having a transparency that varies from a maximum at the center to a minimum at the outer edge. Another method involves making a photographic print of a mask having uniform size apertures by exposing the mask to a point source of light located relatively close to the mask and relying on the inverse-square law and the geometry to produce the variation in light intensity from the center outward required to produce the desired variation in aperture size. In both of these methods, it is difficult and sometimes impossible to produce the precise grading desired. Moreover, varying the light intensity is an inefficient method of causing differential growth in the size of the exposed areas.

SUMMARY OF THE INVENTION

An object of the present invention is to provide a new method of making a graded master, for use in making graded shadow masks for color picture tubes.

The new method involves preparing a first master comprising an opaque layer having a multiplicity of transparent areas of a given uniform size in a given array, and then photographically producing a second master comprising a replica of the array of transparent areas while varying the time of exposure as a function of the radius of the array, to produce a desired radial variation in the size of the areas in the replica corresponding to the transparent areas. The first master may be prepared by making a tone-reversal contact print of a layer of transparent material having a multiplicity of opaque dots of the given uniform size in the given array. Preferably, the second step involves contact printing the first master with a positive-type emulsion while varying the time of exposure as a function of the radius of the array, to produce a positive replica having transparent areas with the desired radial grading in size, and then the second master is contact printed with a negative-type emulsion to produce a third and final master comprising a transparent layer having opaque dots of graded size corresponding to the graded transparent areas of the second master. Alternatively, the second step may involve contact printing the first master with a negative-type emulsion while varying the time of exposure as a function of the radius of the array to produce a negative replica with graded opaque dots on a transparent layer. The time of exposure during contact printing in the second step may be varied as a function of radius by exposure through a continuously-rotating shutter having a specially shaped aperture, or by an iris having a substantially-circular aperture that can be varied in diameter with time.

BRIEF DESCRIPTION OF THE DRAWING

FIG. 1 is a plan view of a multi-apertured shadow mask for a color picture tube.

FIG. 2 is an enlarged detail view showing a group of the apertures of the mask of FIG. 1.

FIG. 3 is a fragmentary section of the mask of FIG. 1 showing one of the apertures.

FIG. 4 is a typical grading curve for the apertures of a graded mask.

FIGS. 5, 6 and 7 are schematic sectional views showing the step of converting a master having uniform size apertures to one having graded apertures in accordance with the invention.

FIG. 9 is a graph showing the time required to produce various amounts of dot growth in the photographic apparatus used.

FIG. 10 is a plot of one quadrant of the shutter aperture required to produce a given radial variation in dot size.

DESCRIPTION OF THE PREFERRED EMBODIMENTS

Figure 8:
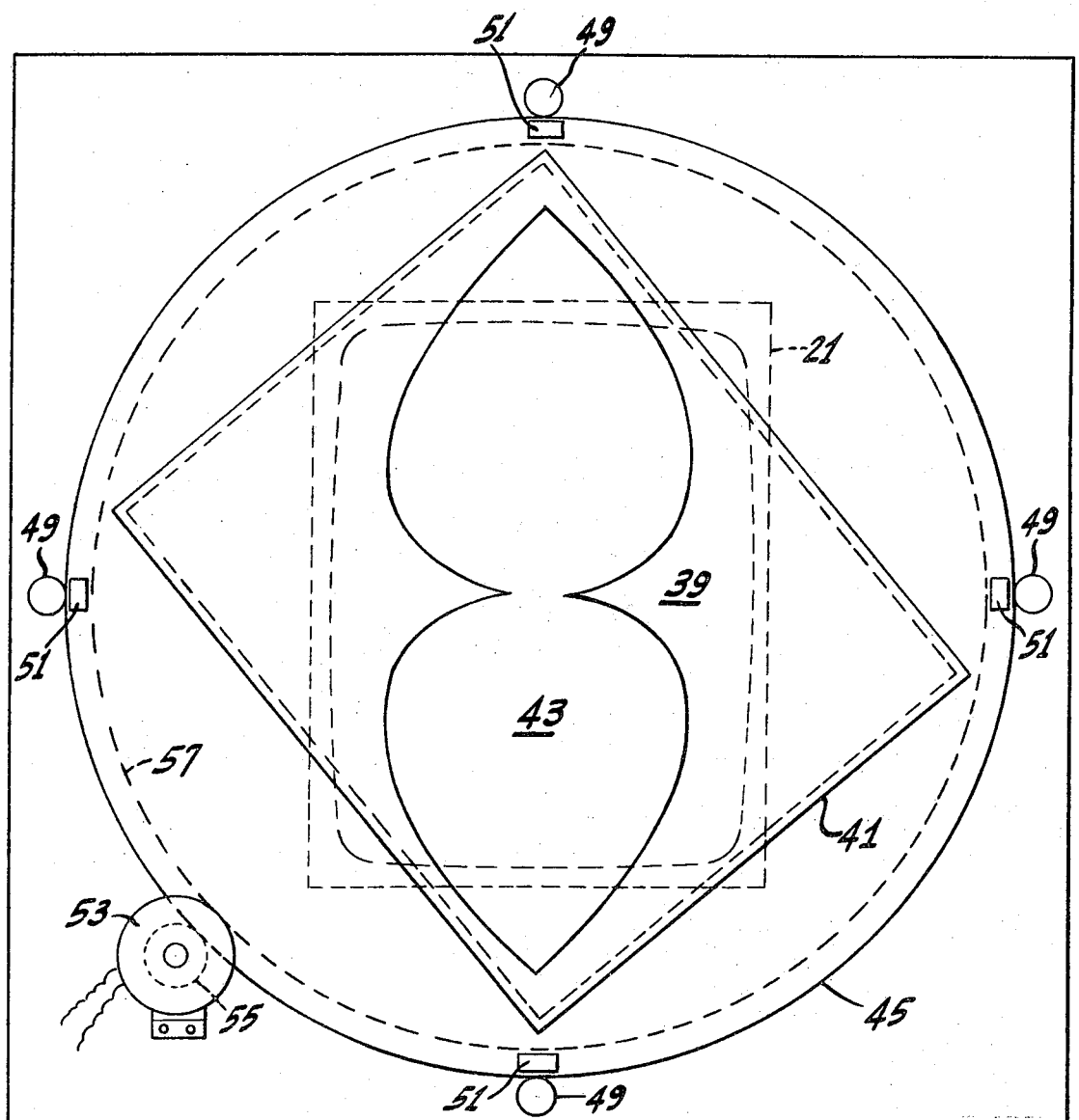
FIG. 8 is a plan view of a rotating-shutter apparatus used in FIG. 7.

FIGS. 1–3 show a typical blank for a shadow mask for color picture tubes. The mask 1 may be a 6 mil thick sheet of stainless steel having several hundred thousand circular apertures 3 arranged in a predetermined array, for example, a hexagonal array, as shown in FIG. 2. For example, in a 25" color picture tube, the vertical spacing $b$ of the apertures 3 may be about 23 mils, and the apertured area 5 of the mask, bounded by the dot-dash curve A in FIG. 1, may have a maximum (diagonal) viewable dimension V of 22.44 inches. As shown in FIG. 3, each aperture 3 is formed (by etching) with a portion 7 having a smaller diameter B and a portion 9 having a larger diameter C. The diameter C is preferably uniform for all of the apertures. The minimum size or diameter B of the apertures 3 varies radially from a maximum at the center to a minimum at the outer edge of the mask. FIG. 4 shows a typical grading curve of aperture size B plotted against radial distance R from the center of the mask 1, according to the formula, $B = B_0 - DR^2$, where $B_0$ is 9.60 mils and D is .013504. In this case, the mask apertures 3 have a diameter B of 9.60 mils at the center and 7.90 mils at the maximum radius, 11.22 inches. Thus, the maximum difference in aperture size is 9.60−7.90=1.70 mils.

A preferred method for making a graded master for use in printing the desired pattern of graded apertures in a shadow mask will be described in connection with FIGS. 5 through 12. In the description, and in the claims, the following definitions will apply. A stencil master is a layer or sheet of a material having a pattern or array of spaced opaque or transparent (clear) areas on a background of the opposite kind. A positive stencil master is one having opaque areas or dots on a transparent background. A negative master is one having transparent areas in an opaque background. A positive master is also called a positive; dot master, and a negative master is also called a negative dot master or aperture master. A tone reversal is a conversion from clear to opaque, or vice-versa. A positive replica of a given pattern is a mirror-image duplicate thereof with no tone reversal, with or without a change in dot or aperture size. A negative replica of a given pattern is a mirror-image duplicate thereof with a tone-reversal, e.g. opaque-to-clear, or vice-versa, also with or without a change in dot or aperture size. A positive-type emulsion is one, such as Autopositive Emulsion, in which the exposed areas become clear or transparent upon development, and the unexposed areas remain opaque. A negative-type emulsion is one, such as Ortho III Emulsion, in which the unexposed areas become clear upon development, and the exposed areas are opaque. A contact print is any print that is photographically produced by exposing portions of a layer of a photosensitive emulsion to light passing through a master or transparency disposed substantially in contact with the emulsion and then developing the exposed emulsion.

The starting element of the method of FIG. 5 is a positive master 15 comprising a sheet 17 of transparent plastic or glass having a multiplicity of opaque areas or dots 19 of uniform size on a clear background 20 and arranged in an array or pattern corresponding to the desired pattern of apertures in the apertured area 5 of the shadow mask 1 of FIG. 1. Such a master is known in the art, and may be made by any of several known methods. For example, one could make a negative master having the desired pattern of clear areas in an opaque background, by the method described in Wicklund Patent 2,757,087, issued July 31, 1956, and then make the desired positive master by contact printing the negative master onto a negative-type emulsion such as Ortho III. In a preferred method, a fragmentary positive master is prepared by mechanically plotting a small number, e.g. 5, of opaque dots on a glass plate in the desired hexagonal pattern at an enlarged scale of 30 to 1 over the final dot size. This master is then photographically reduced by 10 to 1 in a camera and converted to a negative master having transparent areas enlarged 3 to 1 over the final stencil. Then, the negative master is mounted in a precision artwork generator or plotter which makes a further reduction in size of 3 to 1 and steps the master over the desired area of the surface of a transparent sheet coated with a negative-type emulsion, to produce the desired positive master 15 with uniform size opaque dots 19. The size of the dots in the fragmentary master is such that, after the 30 to 1 reduction, the dots 19 have a diameter equal to that of the smallest holes in the desired graded mask, or 7.90 mils in the example chosen.

The positive master 15 is placed upon a transparent sheet 21 which has been coated with a negative-type emulsion layer 23, with the opaque dots in contact with the emulsion, as shown in FIG. 5. The master 15 is exposed to light L and the emulsion 23 is developed to form the negative master 25 of FIG. 6 wherein the dot-like areas 27 of emulsion 23 opposite the dots 19 are clear or transparent and the remainder of the emulsion is opaque. The time of exposure in FIG. 5 is such that no substantial change in size occurs in converting the opaque dots 19 to clear areas 27.

FIGS. 7 through 12 illustrate a preferred method of using the negative master 25 to produce a positive master having graded opaque dots located in the same array as the clear areas 27 of master 25. The master 25 is positioned next to a transparent sheet 31 having a coating 33 of a positive-type emulsion, with the clear areas 21 in contact with the emulsion, and exposed to light from a concentrated source 35 passing through a rotating shutter located close to the master 25, as indicated by the dashed line 37 in FIG. 7.

As shown in FIG. 8, the rotating shutter 39 may consist of a glass or plastic sheet 41 having one side painted black except for a bare (clear) area or aperture 43 having a special shape for varying the time of exposure of the master 25 in a predetermined manner, from a maximum at the center to a minimum at the outer edge. In the apparatus shown, the shutter plate 41 is attached to an opaque circular plate 45, e.g. of aluminum, which is rotatably mounted on a support platform 47 by four sets of three rollers each. Four rollers 49 engage the outer edge of plate 45 and the other eight rollers 51 engage the top and bottom surfaces of the plate 41. Each set of rollers may be mounted on the platform 47 by a single bracket (not shown). The plate 41 is mounted in overlapping relation with a slightly smaller rectangular opening in the circular plate 45, with the geometric center of the aperture 43 centered with the circular plate 45. The circular plate 45 is continuously rotated, to rotate the shutter 39, by means of an electric motor 53 mounted on the platform 47 and having a roller 55 engaging the outer edge of the plate 45. The platform 47 has a circular opening 57 smaller than the circular plate 45. The master 25 of FIG. 7 is shown in dotted lines in FIG. 8 to show the relationship of the shutter 39 and aperture 43 to the master 25.

The exact shape of the shutter aperture 43 required to produce mask apertures with the grading shown in FIG. 5 is determined as follows. The desired aperture size B at each radial distance from the center, at 1 inch intervals, is determined from the formula $B=9.6-.013504R^2$, and entered in the following table:

| R<br>Radial distance from center, inches | B<br>Aperture size, mils | G<br>Dot size growth from edge, mils | T<br>Exposure time required, minutes | P<br>Percent of maximum time, percent | θ<br>Angle in each quadrant, degrees |
|---|---|---|---|---|---|
| 0 | 9.6 | 1.7 | 15.50 | 100 | 90 |
| 1 | 9.59 | 1.69 | 15.25 | 98.4 | 88.6 |
| 2 | 9.55 | 1.65 | 14.75 | 95.2 | 85.7 |
| 3 | 9.48 | 1.58 | 13.90 | 89.7 | 80.7 |
| 4 | 9.38 | 1.48 | 12.90 | 83.2 | 74.9 |
| 5 | 9.26 | 1.36 | 11.60 | 74.8 | 67.3 |
| 6 | 9.11 | 1.21 | 10.20 | 65.7 | 59.1 |
| 7 | 8.96 | 1.06 | 8.80 | 56.8 | 51.1 |
| 8 | 8.74 | .84 | 7.01 | 45.2 | 40.7 |
| 9 | 8.51 | .61 | 5.40 | 34.8 | 31.3 |
| 10 | 8.25 | .35 | 4.00 | 25.8 | 23.2 |
| 11 | 7.97 | .07 | 2.57 | 16.6 | 14.9 |
| 11.22 | 7.90 | 0 | 250 | 16.1 | 14.5 |

Next, the dot size growth G, in mils, required at each radial distance is determined, by subtracting the diameter, 7.90 mils, of the clear areas 27 from the desired aperture size B, and entered in the table. The exposure times in minutes required by the photographic apparatus used to produce various amounts of dot size growth are determined experimentally and plotted in FIG. 9, wherein the curve 59 represents the average of the experimental data. Then, the exposure time T required at each radial distance R is read from the curve 59 of FIG. 9 and entered in the table, together with the percentage P of the maximum time of 15.50 minutes. The next step is to determine the shape of one quadrant of the shutter aperture 43, as plotted in FIG. 10. The shape is such that the exposure varies from total exposure at the center of the master, at 90° from the vertical axis, to zero exposure at 0° (vertical axis). The shutter 39 is rotated continuously at about 30 revolutions per minute. Thus, the total number of revolutions is about 465, and hence, any fraction of a revolution at the end can be ignored. The angle of exposure θ for each radial distance is calculated as P×90°, entered in the table, and plotted in FIG. 10 up to the value R=11.22 inches at the edge of the master. The smooth curve 61 connecting the plotted points is the aperture shape necessary to produce the radial variation in exposure time required to produce the desired grading of the mask apertures. This curve 61 is duplicated, on a different scale, for the four quadrants of the aperture 43 in FIG. 8.

Figure 11:
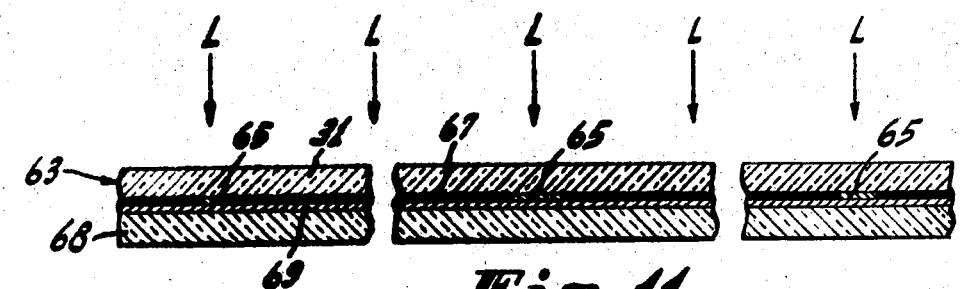
FIG. 11 is a schematic sectional view showing the step of converting the master resulting from FIG. 7 to a negative replica thereof.

Referring back to FIG. 7, the master 25 and emulsion layer 33 are exposed to light from source 35 through the rotating shutter 39 for 15.50 minutes. At the end of this time, the emulsion layer 33 is developed to produce a negative master 63, as shown in FIG. 11, having clear areas 65 that are graded in size from a maximum at the center to a minimum at the outer edge in an opaque background 67. The maximum exposure at the center causes the exposed areas of the emulsion 33 opposite the center areas 27 of master 25 to grow 1.70 mils, to 9.60 mils; whereas the minimum exposure, 2.50 minutes, at the outer edge produces no substantial growth in size from the 7.90 mils of the edge areas 27.

Figure 12:
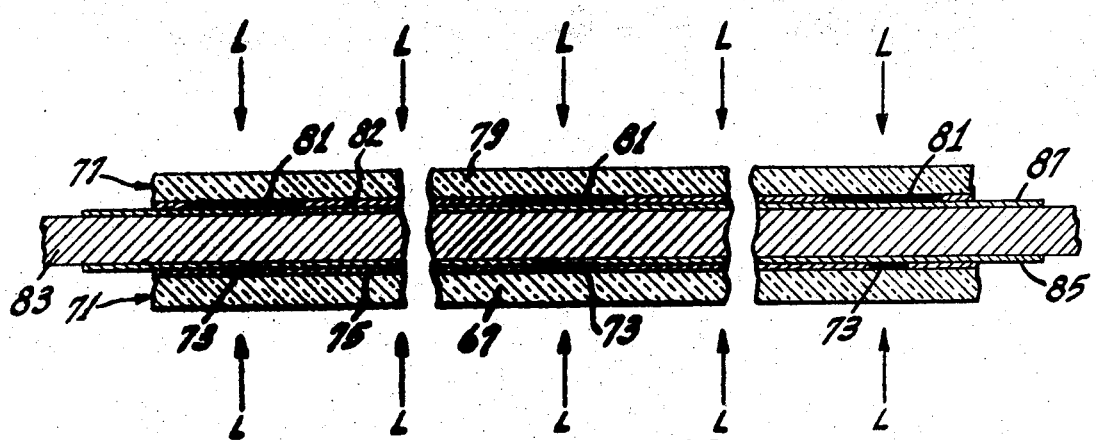
FIG. 12 is a sectional view showing, in part, the manner in which a first master with graded apertures and a second master with uniform size apertures are used to produce a graded-aperture shadow mask.

In FIG. 11, the negative graded-aperture master 63 is contact printed on a transparent plate 68 coated with a negative-type emulsion layer 69, to convert it into a positive master 71 having graded opaque dots 73, having the same sizes as the corresponding clear areas 67, on a clear background 75, as shown in FIG. 12.

FIG. 12 shows how the positive graded dot master 71 is used, with a positive stencil 77 comprising a transparent sheet 79 having an array of large opaque dots 81 of uniform size, e.g. 17 mils, on a clear background 82 and arranged in the same pattern as the graded dots of master 71, to form graded apertures in a shadow mask. A thin sheet 83 of steel is coated on opposite sides with photosensitive layers 85 and 87 adapted to be hardened by exposure to light. The two masters 71 and 77 are placed in contact with the layers 85 and 87, respectively, with the dot patterns in precise registration with each other, and exposed to light L from both sides. When the layers 85 and 87 are developed, the unexposed dot areas thereof are washed away leaving openings in the hardened exposed background area. Then, the dot-like areas of the mask sheet 83 at these openings are etched out from both sides by an acid bath, as indicated in FIG. 3, and the layers 85 and 87 are removed to produce the final multi-aperture flat mask with the desired graded apertures. The master 77 can be made by any known method, including the preferred method described above for making the unifor size dot master 15.

Figure 13:
FIG. 13 is a sectional view similar to FIG. 6 of a modification thereof.

In the preferred method described above, wherein a positive-type emulsion is used for layer 33 in FIG. 7, it is easy to produce the maximum required growth in dot size, at the center of the master, in one operation. In fact, dot growth of more than 2.4 mils could be produced with the particular apparatus used. For other applications requiring smaller dot growth, a negative-type emulsion can be used for layer 33 in FIG. 7 to produce a positive master 89 having graded opaque dots 91 on a transparent background 93, as shown in FIG. 13. Tests with Ortho III emulsion have shown that dots printed from a negative master can be expanded from a minimum of .7 mil to a maximum of 1.2 mils. An advantage of using a negative-type emulsion 33 in FIG. 7 is that the conversion in FIG. 11 from a negative to a positive master is eliminated. However, since the stencil 89 in FIG. 13 is a mirror image of the master 71, a mirror image of the master 77 should be used in FIG. 12 with the master 89.

In an alternate method, instead of varying the time of exposure of the master 25 during contact printing as in FIG. 7, the negative master 25 is contact printed on a negative-type emulsion to produce an undeveloped print comprising exposed opaque dots of uniform size in an unexposed opaque background on a transparent support sheet. Then, this undeveloped print is subjected to radially variable background exposure by light from a source 35 passing through a rotating shutter 39 as in FIGS. 7 and 8 to produce the desired differential dot growth, and developed to produce the desired positive master with graded size opaque dots on a clear background, like the master 89 in FIG. 13. Experiments have been shown that dot growth up to about 2 mils can be achieved by this method.

We claim:

1. A method of making a graded photoprinting master comprising a multiplicity of spaced opaque areas disposed on a transparent substrate in a systematic cyclic array in which the areas decrease in size as the distance from the center of the array increases, comprising the steps of:

(a) preparing a first master comprising a layer of opaque material having a multiplicity of spaced transparent areas of a given uniform size located in said array; and (b) photographically producing from said first master a second master comprising a substantial replica of said array of transparent areas by contact printing said first master upon a photosensitive layer including varying the time of exposure across said array as a function of the distance from the center of said array with the maximum time at the center of said array and the minimum time at the outer edge thereof by exposing said first master to light passing through a continuously rotating shutter having a specially shaped central aperture to produce a desired radial variation in the sizes of the exposed areas of said replica.

2. A method according to claim 1, wherein said aperture is shaped to produce a radial variation in the size of said transparent areas according to the formula $$B = B_0 - DR^2$$

where B is the variable diameter of said areas, $B_0$ is the diameter of the areas at the center of said array, D is a predetermined constant, and R is the radial distance of each area from the center of said array.

3. A method of making a graded photoprinting master comprising a multiplicity of spaced opaque dots disposed on a transparent substrate in a hexagonal cyclic array in which the dots decrease in size as the distance from the center of the array increases, comprising the steps of:

(a) preparing a first master comprising a layer of opaque material having a multiplicity of spaced transparent areas of a given uniform size located in said array;

(b) contact printing said first master on a transparent substrate coated with a positive-type emulsion while varying the time of exposure as a function of the radial distance from the center of said array, with the maximum time at the center of said array and the minimum time at the outer edge thereof by exposing said first master to light passing through a continuously rotating shutter having a specially shaped central aperture to produce a second master having spaced transparent areas with a desired radial variation in size; and (c) contact printing said second master on a transparent substrate coated with a negative-type emulsion to produce a third master having spaced opaque dots with substantially the same radial variation in size as the transparent areas of said second master.

4. A method according to claim 3, wherein step (a) involves contact printing a master, comprising a transparent substrate having a multiplicity of spaced opaque dots of said given uniform size located thereon in said desired array, on a transparent substrate coated with a negative-type emulsion.

References Cited

UNITED STATES PATENTS

| | | | |
|---|---|---|---|
| 2,145,427 | 1/1939 | Morris | 95—64 |
| 2,625,734 | 1/1953 | Law | 96—35 X |
| 2,755,402 | 7/1956 | Morrell | 313—85 X |
| 2,827,390 | 3/1958 | Garrigus | 96—36.1 |
| 2,972,931 | 2/1961 | Roob | 355—71 |
| 3,146,368 | 8/1964 | Fiore | 96—36.1 |

OTHER REFERENCES

Kauffman, H. A.: "RCA Technical Notes," RCA TN 149, March 1958.

Anon: "Constructing the Tricolor Picture Tube," Electronics, May 1951, pp. 86–88.

Baines, H.: The Science of Photography, 1958, London, p. 135.

NORMAN G. TORCHIN, Primary Examiner

J. R. HIGHTOWER, Assistant Examiner

U.S. Cl. X.R.

96—44